(12) United States Patent
Etherington et al.

(10) Patent No.: US 6,279,726 B1
(45) Date of Patent: Aug. 28, 2001

(54) SELF-CLEANING DRIVE MECHANISM FOR DRIVING CONVEYOR BELTS

(75) Inventors: Michael Etherington, Winchester; Joseph Allen Bowen, Gore, both of VA (US)

(73) Assignee: Ashworth Bros., Inc., Winchester, VA (US)

(*) Notice: Subject to any disclaimer, the term of this patent is extended or adjusted under 35 U.S.C. 154(b) by 0 days.

(21) Appl. No.: 09/526,689

(22) Filed: Mar. 15, 2000

(51) Int. Cl.[7] .......................... B65G 45/00; B65G 45/10; B65G 45/20; B65G 45/24; B65G 45/26
(52) U.S. Cl. ............................. 198/494; 198/498
(58) Field of Search ..................... 198/494, 498

(56) References Cited

U.S. PATENT DOCUMENTS

| | | |
|---|---|---|
| 2,784,836 | 3/1957 | Le Tourneau . |
| 4,072,062 * | 2/1978 | Morling et al. ............... 198/494 X |
| 4,143,757 | 3/1979 | Wallenfang . |
| 4,175,796 | 11/1979 | Boggs et al. . |
| 4,816,010 * | 3/1989 | Reynolds ..................... 198/494 X |
| 5,437,580 * | 8/1995 | Doring ......................... 474/153 X |
| 5,630,500 * | 5/1997 | Conrad ......................... 198/833 X |
| 5,934,448 | 8/1999 | Kucharski et al. . |

FOREIGN PATENT DOCUMENTS

716929 * 2/1980 (SU) ..................... 198/498

* cited by examiner

Primary Examiner—Donald P. Walsh
Assistant Examiner—Gene O. Crawford
(74) Attorney, Agent, or Firm—Nixon Peabody LLP; Jeffrey L. Costellia; Tim L. Brackett, Jr.

(57) ABSTRACT

An improved self-cleaning drive mechanism for driving a conveyor belt including a rotatable drive gear having a plurality of receiving grooves adapted to engage and drive the conveyor belt, the plurality of receiving grooves being disposed along a periphery of the rotatable drive gear, and a rotatable cleaning wheel having a plurality of cleaning members positioned to engage the plurality of receiving grooves as the rotatable drive gear is rotated. The plurality of cleaning members are sized to engage the plurality of receiving grooves and displace debris in the plurality of receiving grooves when the plurality of receiving grooves are engaged by the plurality of cleaning members. In one embodiment, the plurality of cleaning members may include a plurality of cleaning teeth disposed along a periphery of the rotatable cleaning wheel, the plurality of cleaning teeth extending radially outwardly from the rotatable cleaning wheel to engage the rotatable drive gear. In another embodiment, the cleaning wheel may include a plurality of cleaning rods that are disposed between and supported by a first support plate and a second support plate.

21 Claims, 2 Drawing Sheets

A-A

A-A

SELF-CLEANING DRIVE MECHANISM FOR DRIVING CONVEYOR BELTS

BACKGROUND OF THE INVENTION

1. Field of the Invention

The present invention is related to the field of conveyor belts. More specifically, the invention relates to conveyor belt drive mechanism that are self-cleaning.

2. Description of Related Art

Conveyor systems having a conveyor belt are commonly used in various industrial fields for material handling and processing purposes. Many of these conveyor systems have conveyor belts that include linkages or connecting rods which interconnect numerous overlay elements together to form the conveying surface area of the conveyor belt. Such conveyor belts are typically driven by a drive mechanism which includes a motor driven drive gear with a plurality of teeth that engage and drive the linkages or connecting rods of the conveyor belt. For example, U.S. Pat. No. 5,934,448 to Kucharski et al. discloses a conveyor belt including a plurality of wickets which are interconnected by rods whereby a drive sprocket drives the conveyor belt by engaging a sprocket-engagement area on the rods.

Increasingly, conveyor belts are used in manufacturing processes where the items being conveyed are frequently processed on the conveyor belt itself while being conveyed from one location to another. For example, in the food processing industry, processes including washing, cooling and freezing of food items as well as other processes are frequently done directly on the conveyor belt as the food items are being conveyed. Because the food items are processed directly on the conveyor belt, food processors have found that efficient use of both time and space may be realized. In this regard, conventional drive mechanisms using a drive gear have been found to be inadequate in many processing applications where the grooves between the teeth of the drive gear can become clogged.

For instance, items or portions of items being conveyed can become lodged in the grooves between the teeth of the drive gear. This has been especially problematic in applications where the items being conveyed are very small and also in the food industries where small portions of the food items being conveyed tend to break off onto the conveying surface of the belt, these small portions eventually lodging in the grooves of the drive gear. Over time, these small portions of the food items tended to build up and clog these grooves. Also in the food industry, conveyors are used in freezing processes where the food item is conveyed into a freezing chamber and blasted with freezing air to instantly freeze the food item being conveyed. It has been found that in such applications, ice tends to build up in the grooves of the drive gear. As can be appreciated, when the grooves between the teeth of the drive gear become clogged, the drive gear can no longer engage the linkages or connecting rods of the conveyor belt thus rendering the conveyor belt inoperative until the grooves of the drive gear is unclogged of the food, ice, or other debris. Of course, accumulation of debris in the grooves of the drive gear is a problem experienced not only in the food industry, but also in many different industries that utilize conveyor belts.

In an attempt to address such problems, U.S. Pat. No. 2,784,836 to Le Tourneau discloses a self-cleaning sprocket including a plurality of teeth with an inclined recess between each pair of teeth. The inclined recess aids in keeping the teeth of the sprocket clean as it engages the pins. In addition, other self-cleaning drive mechanisms have also been created. For instance, a self-cleaning drive mechanism has been designed with a drive gear having a plurality of teeth that engage and drive the linkages or connecting rods of a conveyor belt. In this regard, each of the plurality of teeth includes a receiving groove that receive a linkage or a connecting rod and exert a displacing force on the linkage or connecting rod thereby displacing the conveyor belt. The self-cleaning drive mechanism also typically includes a motor for driving the drive gear as well as other support members that support the drive gear in proper position.

Moreover, receiving grooves for the self-cleaning sprocket have been designed to facilitate the self-cleaning feature. In particular, a bottom surface of the receiving groove of each of the plurality of teeth may be chevron shaped and have tapered relief surfaces. In operation, as the linkage or connecting rod of the conveyor belt is engaged by the receiving groove, the linkage or connecting rod forcibly displaces any debris that may be present in the receiving groove. The displacement of the debris is facilitated by the tapered relief surfaces so that as the linkage or connecting rod contacts the bottom surface, the debris is forced out of the receiving groove. The above described prior art self-cleaning drive mechanism has been found to be effective in various applications where the debris caught in the receiving groove is relatively soft such as soft food items. However, the prior art self-cleaning drive mechanism has been found to be inadequate where the debris or debris build-up is relatively hard.

In particular, the present applicants have found that when the debris or debris build-up is hard, such as frozen food particles and ice build-up in applications where the conveyor is used for freezing processes, the linkage or connecting rod engaging the receiving groove did not exert enough force on the debris to displace the debris when conventional amount of tension is placed on the conveyor belt. Thus, in such freezing process applications, such prior art drive mechanisms have been found to be unreliable and inadequate. The applicants sought to increase the tension placed on the conveyor belt to thereby increase the force exerted by the linkage or connecting rod. Whereas this appeared to improve the situation, it was found that such increase in conveyor belt tension increased wear on the conveyor belt and thus, decreased the belt's durability. Of course, to alleviate this disadvantage, the conveyor belt itself could be made more robust and durable. However, such improvements in the belt would be very expensive due to the increased material cost and weight which would require a more robust drive mechanism and components such as the motor and the other support members.

Therefore, there exists an unfulfilled need for an improved self-cleaning drive mechanism for driving a conveyor belt which will clean hard debris and even ice build-up. There also exists an unfulfilled need for such a self-cleaning drive mechanism which will clean such debris and build-up in a reliable and cost effective manner.

BRIEF SUMMARY OF THE INVENTION

In view of the foregoing, it is an object of the present invention to provide an improved self-cleaning drive mechanism for driving a conveyor belt.

A second object of the present invention is to provide an improved self-cleaning drive mechanism which will clean hard debris and ice build-up.

Yet another object of the present invention is to provide a self-cleaning drive mechanism which is reliable.

Still further, it is an object of the present invention to provide such a self-cleaning drive mechanism which is also cost effective.

In accordance with preferred embodiments of the present invention, these objects are achieved by an improved self-cleaning drive mechanism for driving a conveyor belt including a rotatable drive gear having a plurality of receiving grooves adapted to engage and drive the conveyor belt, the plurality of receiving grooves being disposed along a periphery of the rotatable drive gear, and a rotatable cleaning wheel having a plurality of cleaning members positioned to engage the plurality of receiving grooves as the rotatable drive gear is rotated. In particular, these objects are obtained by such a self-cleaning drive mechanism where the plurality of cleaning members are sized to engage the plurality of receiving grooves and displace debris in the plurality of receiving grooves when the plurality of receiving grooves are engaged by the plurality of cleaning members.

In accordance with one embodiment of the present invention, the plurality of cleaning members may include a plurality of cleaning teeth disposed along a periphery of the rotatable cleaning wheel, the plurality of cleaning teeth extending radially outwardly from the rotatable cleaning wheel to engage the rotatable drive gear.

In another embodiment of the self-cleaning drive mechanism, the cleaning wheel may include a first support plate and the plurality of cleaning members may include a plurality of cleaning rods. In this regard, the plurality of cleaning rods may be supported at an end by the first support plate and may extend perpendicularly outward from the first support plate. Preferably, the cleaning wheel may also include a second support plate positioned adjacent to the first support plate, the plurality of cleaning rods being disposed between and supported by the first support plate and the second support plate.

In alternative embodiments or even the above noted embodiments of the self-cleaning drive mechanism, the rotatable drive gear may include a plurality of drive teeth disposed along the periphery of the rotatable drive gear, each of the plurality of drive teeth extending radially outwardly from the drive gear and each of the plurality of receiving grooves being positioned on each of the plurality of drive teeth. Each of the plurality of receiving grooves may also include a chevron shaped bottom surface having at least one tapered relief surface designed to facilitate the displacement of the debris in the plurality of receiving grooves. Moreover, each of the plurality of drive teeth may include a center channel that circumferentially extends through the plurality of receiving grooves. A channel cleaner that extends from a support member of the drive mechanism and into the center channel may also be provided on the self-cleaning drive mechanism for displacing debris in the center channel when the rotatable drive gear is rotated. In addition, the self-cleaning drive mechanism may further be provided with an adjustable biasing member adapted to adjust a force of engagement between the rotatable cleaning wheel and the rotatable drive gear.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
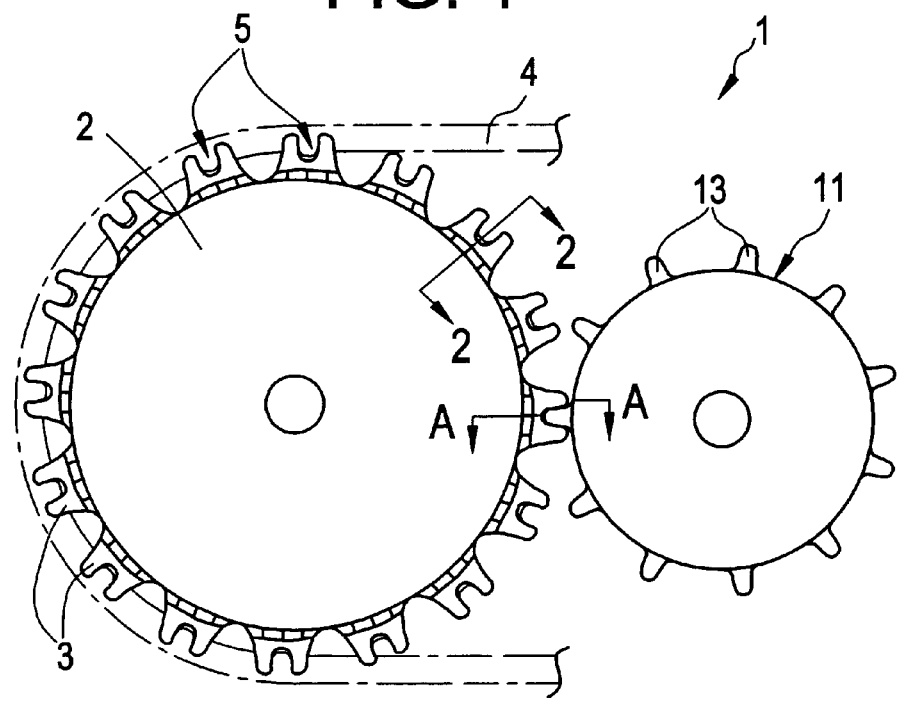
FIG. 1 is a side view of a self-cleaning drive mechanism for driving a conveyor belt in accordance with one embodiment of the present invention.

FIG. 1 illustrates an improved self-cleaning drive mechanism 1 for driving a conveyor belt 4 which will clean hard debris and even ice build-up in a reliable and cost effective manner. As will be described below, by providing a self-cleaning drive mechanism 1 which includes a rotatable cleaning wheel 11, the present invention allows higher displacement forces to be exerted in displacing debris from self-cleaning drive mechanism 1 than was possible in prior art drive mechanisms so that even hard debris and ice build-up can be effectively removed from the rotatable drive gear. It is initially noted that although the following describes numerous features of the embodiments of the present invention as illustrated in the drawings, all of these features need not be present in order to practice the present invention but these features are fully described so that a clear understanding of the illustrated embodiments may be attained.

As can be clearly seen in FIG. 1, the self-cleaning drive mechanism 1 in accordance with one embodiment of the present invention includes a rotatable drive gear 2 having a plurality of drive teeth 3 that engage and drive the conveyor belt 4. In particular, as shown in FIG. 1, the plurality of drive teeth 3 are disposed along the periphery of the rotatable drive gear 2, each of the plurality of drive teeth 3 extending radially outwardly from the rotatable drive gear 2. Each of the plurality of teeth 3 includes a receiving groove 5 such that the plurality of receiving grooves 5 are disposed along a periphery of the rotatable drive gear 2. The plurality of receiving grooves 5 receives a linkage or a connecting rod (not shown) of the conveyor belt 4 and exert a displacing force on the linkage or connecting rod thereby displacing the conveyor belt 4 in the direction of rotation of the rotatable drive gear 2. As can be most clearly seen in FIG. 2, the bottom surface 7 of the receiving groove 5 of each of the plurality of teeth 3 is chevron shaped with tapered relief surfaces 8. These tapered relief surfaces 8 facilitate the displacement of debris present in the receiving grooves 5 in the manner discussed further below. In addition, the self-cleaning drive mechanism 1 may also include a motor (not shown) for driving the drive gear 2 as well as other support members (not shown) that support the drive gear 2 in its proper position.

Figure 3:
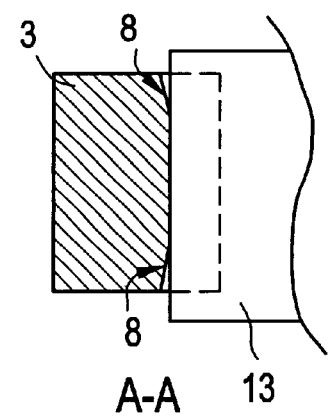
FIG. 3 is a cross-sectional view of a drive gear tooth of the self-cleaning drive mechanism of FIG. 1 as viewed along A—A.

The self-cleaning drive mechanism 1 in accordance with the present invention also includes a rotatable cleaning wheel 11 that maintains the rotatable drive gear 2 in a cleaned state. As can be seen in FIG. 1, the rotatable cleaning wheel 11 includes a plurality of cleaning members such as the plurality of cleaning teeth 13 positioned to engage the plurality of receiving grooves 5 as the rotatable drive gear 2 is rotated. In the embodiment shown, the plurality of cleaning teeth 13 are disposed along the periphery of the rotatable cleaning wheel 11 and extend radially outwardly from the rotatable cleaning wheel 11 to engage the rotatable drive gear 2 in the manner illustrated. In particular, the plurality of cleaning teeth 13 (i.e. cleaning members) are sized to engage the plurality of receiving grooves 5 and to displace debris in the plurality of receiving grooves 5 when the plurality of receiving grooves 5 are engaged by the plurality of cleaning teeth 13. Thus, as clearly shown in FIG. 3, as the rotatable drive gear 2 is rotated, the plurality of cleaning teeth 13 on the rotatable cleaning wheel 11 engage the plurality of receiving grooves 5 thereby compressing any debris in the plurality of receiving grooves 5. Because the bottom surface 7 of the receiving grooves 5 are chevron shaped with tapered relief surfaces 8, the debris is pushed sideways out of the receiving grooves 5 via the tapered relief surfaces 8. Thus, the rotatable cleaning wheel 11 acts to displace the debris in the plurality of receiving grooves 5 and keeps the rotatable drive gear 2 clean and free from debris which may build-up and render the conveyor system inoperable. Moreover, higher displacement forces may be exerted on the debris to displace the debris from the receiving grooves 5 than was possible in prior art drive mechanisms so that even hard debris and ice build-up can be cleaned. In this regard, the self-cleaning drive mechanism 1 may further be provided with an adjustable biasing member (not shown) which is adapted to adjust a force of engagement between the rotatable cleaning wheel 11 and the rotatable drive gear 2. Such adjustable biasing member may be a spring, a gear, a threaded member such as an adjustment screw, or other appropriate member.

Figure 4:
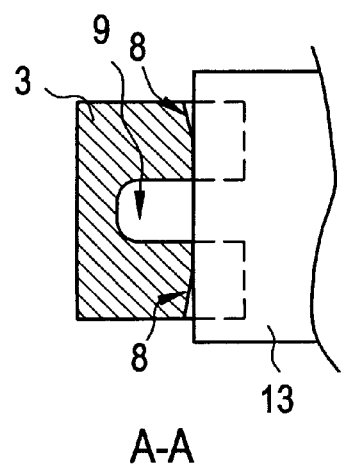
FIG. 4 is a cross-sectional view of another embodiment of a drive gear tooth of the self-cleaning drive mechanism as viewed along A—A.

In an alternative embodiment of the self-cleaning drive mechanism 1, each of the plurality of drive teeth 3 on the rotatable drive gear 2 may also include a center channel 9 as clearly shown in FIG. 4. The center channel 9 circumferentially extends through the plurality of receiving grooves 5 and provides a clearance for a component of the conveyor belt 4 such as a reinforcing rib (not shown) in applications where molded overlay modules are used. Even in this embodiment, each of the plurality of teeth 3 may be chevron shaped with tapered relief surfaces 8 so that the debris is pushed out of the receiving grooves 5 by the plurality of cleaning teeth 13 of the rotatable cleaning wheel 11 via the tapered relief surfaces 8.

Figure 5:
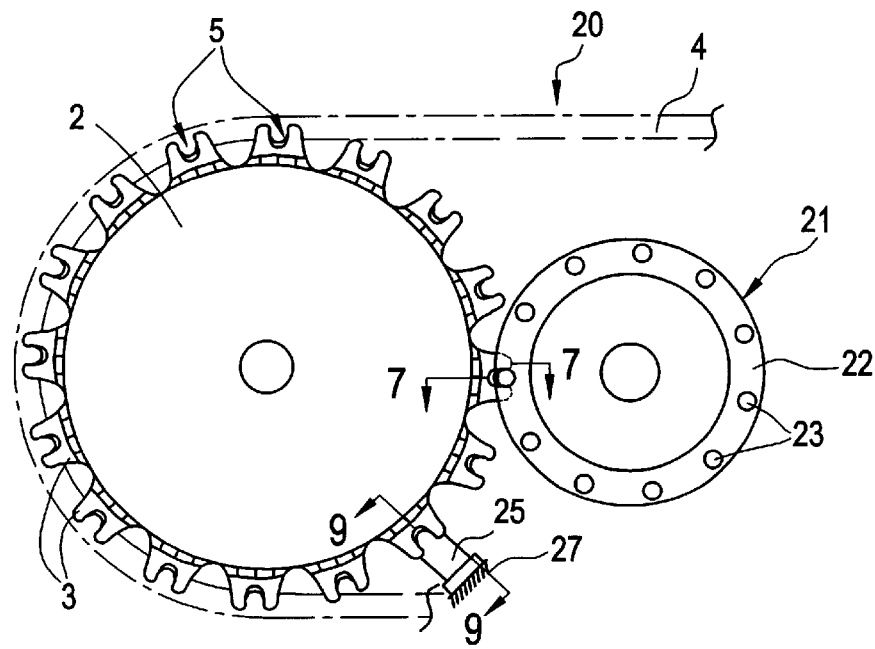
FIG. 5 is a side view of a self-cleaning drive mechanism in accordance with another embodiment of the present invention.
Figure 6:
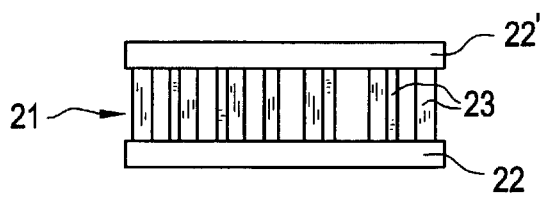
FIG. 6 is a side profile view the cleaning wheel of FIG. 5.

An alternative embodiment of the self-cleaning drive mechanism 20 is illustrated in FIG. 5 where the rotatable cleaning wheel 21 has a plurality of cleaning rods 23 instead of a plurality of cleaning teeth of the previous embodiment. As more clearly illustrated in FIG. 6, the rotatable cleaning wheel 21 includes a first support plate 22, a second support plate 22' positioned adjacent to the first support plate 22, and a plurality of cleaning rods 23 that serve as the plurality of cleaning members, the plurality of cleaning rods 23 extending perpendicularly and being supported between the first support plate 22 and the second support plate 22'. Thus, as clearly shown in FIG. 7, as the rotatable drive gear 2 is rotated, the plurality of cleaning rods 23 on the rotatable cleaning wheel 21 engage and clean the plurality of receiving grooves 5 of the rotatable drive gear 2 by compressing and pushing the debris out of the receiving grooves 5 via the tapered relief surfaces 8 in a manner similar to the embodiment described previously. Accordingly, the self-cleaning drive mechanism 20 in accordance with this alternative embodiment still allows higher displacement forces to be exerted on the debris to displace the debris from the receiving grooves 5 than was possible in prior art drive mechanisms.

Figure 8:
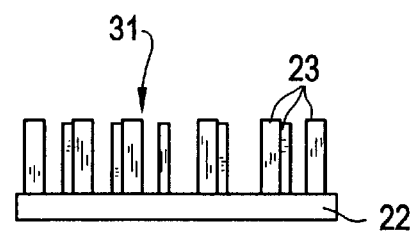
FIG. 8 is a side profile view of a cleaning wheel in accordance with another embodiment of the present invention.

Furthermore, as illustrated in FIG. 8, an alternative embodiment of the rotatable cleaning wheel 31 may be provided with only the first support plate 22 such that the plurality of cleaning rods 23 are supported at only one end by a first support plate 22 so that the plurality of cleaning rods 23 extend perpendicularly outward from the first support plate 22 in a cantilevered manner. However, such embodiment of the rotatable cleaning wheel 31 would be less desirable since such a rotatable cleaning wheel 31 would not be able to exert as high displacement forces on the debris than the cleaning wheels as described in the other embodiments.

Figure 7:
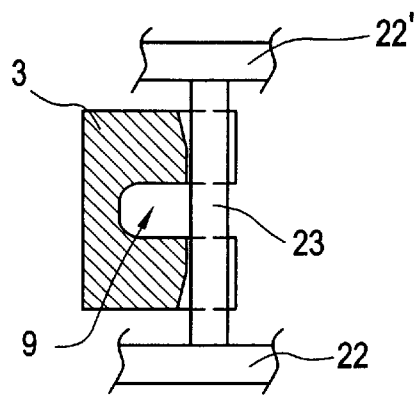
FIG. 7 is a cross-sectional view of a drive gear tooth of the self-cleaning drive mechanism of FIG. 5 as viewed along 7—7.
Figure 9:
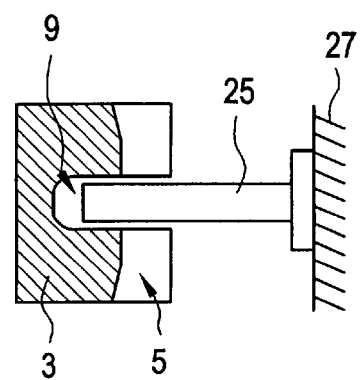
FIG. 9 is a frontal view of the groove cleaner of FIG. 5 as viewed along 9—9.

As can be seen in the illustrated embodiment of FIG. 7, the plurality of drive teeth 3 on the rotatable drive gear 2 also includes a center channel 9 that circumferentially extends through the plurality of receiving grooves 5 as described previously relative to FIG. 4. As previously described, the center channel 9 allows clearance for a component of the conveyor belt 4 such as a reinforcing rib (not shown) in applications where molded overlay modules are used. Because it has been found that some debris may fall into the center channel 9 despite the provisions of the tapered relief surfaces 8, a channel cleaner 25 as shown in FIGS. 5 and 9 may also be used when such center channel 9 is provided. As shown in these figures, the channel cleaner 25 extends from a support member 27 of the self-cleaning drive mechanism 20 into the center channel 9 so as to displace any debris in the center channel 9 when the rotatable drive gear 2 is rotated. In this manner, the center channel 9 may also be kept free from debris thus ensuring clean operation of the self-cleaning drive mechanism 20. Moreover, these embodiments of the self-cleaning drive mechanism 20 having a plurality of cleaning rods 23 may also be provided with an adjustable biasing member (not shown) which is adapted to adjust a force of engagement between the rotatable cleaning wheel 11 and the rotatable drive gear 2.

Figure 2:
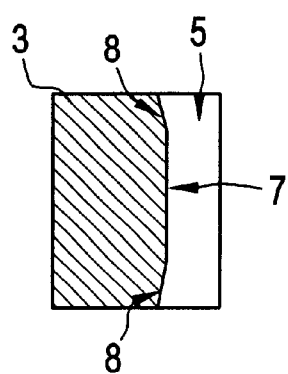
FIG. 2 is a cross-sectional view of a drive gear tooth of the self-cleaning drive mechanism of FIG. 1 as viewed along 2—2.

As can be appreciated, the above embodiments are only few examples of the self-cleaning drive mechanism in accordance with the present invention and the specific features described may or may not be present depending on the needs of the application. For instance, the embodiment of FIG. 1 may also be provided with a channel cleaner if the rotatable drive gear is provided with a center channel shown in FIG. 4. The rotatable drive gear in the embodiment of FIG. 5 may have a cross-sectional profile as shown in FIG. 2 instead. In addition, the bottom surfaces of the plurality of receiving grooves may also have alternative surfaces such as wedge shape instead of the disclosed chevron shape with tapered relief surfaces. However, such alternative shapes have been found to be less effective than the presently disclosed chevron shape in displacing debris in the plurality of receiving grooves.

From the foregoing, it should now be apparent how the present invention provides an improved self-cleaning drive mechanism for driving a conveyor belt which will clean hard debris and even ice build-up in a reliable and cost effective manner. By providing a self-cleaning drive mechanism which includes a rotatable cleaning wheel, the present invention allows higher displacement forces to be exerted on any debris to displace the debris from the receiving grooves than was possible in prior art drive mechanisms so that even hard debris and ice buildup can be effectively removed from the rotatable drive gear in a reliable and cost effective manner. By practicing the present invention, undue wear on the conveyor belt is avoided and expensive improvements to the conveyor belt itself is not required to improve the cleaning performance of the self-cleaning drive mechanism.

While various embodiments in accordance with the present invention have been shown and described, it is understood that-the invention is not limited thereto. These embodiments may be changed, modified and further applied by those skilled in the art. Therefore, this invention is not limited to the details shown and described previously but also includes all such changes and modifications which are encompassed by the appended claims.

Industrial Applicability

The present invention will find applicability in a wide range of industrial applications where conveyor belts and conveyor systems are used, especially in applications where debris or ice build-up on conveyor system components is likely.

What is claimed is:

1. A self-cleaning drive mechanism for driving a conveyor belt comprising:
   a rotatable drive gear having a plurality of receiving grooves adapted to engage and drive said conveyor belt, said plurality of receiving grooves being disposed along a periphery of said rotatable drive gear; and
   a rotatable cleaning wheel having a plurality of cleaning members positioned to engage said plurality of receiving grooves as said rotatable drive gear is rotated.

2. A self-cleaning drive mechanism of claim 1, wherein said plurality of cleaning members are sized to engage said plurality of receiving grooves and displace a debris in said plurality of receiving grooves when said plurality of receiving grooves are engaged by said plurality of cleaning members.

3. A self-cleaning drive mechanism of claim 2, wherein said plurality of cleaning members include a plurality of cleaning teeth disposed along a periphery of said rotatable cleaning wheel, said plurality of cleaning teeth extending radially outwardly from said rotatable cleaning wheel.

4. A self-cleaning drive mechanism of claim 3, wherein each of said plurality of receiving grooves includes a chevron shaped bottom surface having at least one tapered relief surface.

5. A self-cleaning drive mechanism of claim 4, wherein said rotatable drive gear includes a plurality of drive teeth disposed along said periphery of said rotatable drive gear, each of said plurality of drive teeth extending radially outwardly from said drive gear and wherein each of said plurality of receiving grooves are positioned on each of said plurality of drive teeth.

6. A self-cleaning drive mechanism of claim 5, wherein each of said plurality of drive teeth includes a center channel that circumferentially extends through said plurality of receiving grooves.

7. A self-cleaning drive mechanism of claim 6, further comprising a channel cleaner extending from a support member of said drive mechanism into said center channel to displace a debris in said center channel when said rotatable drive gear is rotated.

8. A self-cleaning drive mechanism of claim 2, wherein said cleaning wheel includes a first support plate and said plurality of cleaning members include a plurality of cleaning rods, said plurality of cleaning rods being supported at an end by said first support plate and extending perpendicularly outward from said first support plate.

9. A self-cleaning drive mechanism of claim 8, wherein said cleaning wheel also includes a second support plate positioned adjacent to said first support plate, said plurality of cleaning rods being disposed between and supported by said first support plate and said second support plate.

10. A self-cleaning drive mechanism of claim 9, wherein each of said plurality of receiving grooves includes a chevron shaped bottom surface having at least one tapered relief surface.

11. A self-cleaning drive mechanism of claim 10, wherein said rotatable drive gear includes a plurality of drive teeth disposed along said periphery of said rotatable drive gear, each of said plurality of drive teeth extending radially outwardly from said drive gear and wherein each of said plurality of receiving grooves are positioned on each of said plurality of drive teeth.

12. A self-cleaning drive mechanism of claim 11, wherein each of said plurality of drive teeth includes a center channel that circumferentially extends through said plurality of receiving grooves.

13. A self-cleaning drive mechanism of claim 12, further comprising a channel cleaner extending from a support member of said drive mechanism into said center channel to displace a debris in said center channel when said rotatable drive gear is rotated.

14. A self-cleaning drive mechanism of claim 2, wherein each of said plurality of receiving grooves includes a chevron shaped bottom surface having at least one tapered relief surface.

15. A self-cleaning drive mechanism of claim 14, further comprising an adjustable biasing member adapted to adjust a force of engagement between said rotatable cleaning wheel and said rotatable drive gear.

16. A self-cleaning drive mechanism of claim 15, wherein said rotatable drive gear includes a plurality of drive teeth disposed along said periphery of said rotatable drive gear, each of said plurality of drive teeth extending radially outwardly from said drive gear and wherein each of said plurality of receiving grooves are positioned on each of said plurality of drive teeth.

17. A self-cleaning drive mechanism of claim 16, wherein each of said plurality of drive teeth includes a center channel that circumferentially extends through said plurality of receiving grooves.

18. A self-cleaning drive mechanism of claim 17, further comprising a channel cleaner extending from a support member of said drive mechanism into said center channel to displace a debris in said center channel when said rotatable drive gear is rotated.

19. A self-cleaning drive mechanism for driving a conveyor belt comprising:
   a driving means for driving said conveyor belt, said driving means including a plurality of receiving means for receiving and engaging at least a portion of said conveyor belt; and
   a cleaning means for cleaning said driving means, said cleaning means including a plurality of cleaning members for engaging said plurality of receiving means and for displacing a debris in said plurality of receiving means when said plurality of cleaning members engage said plurality of receiving means.

20. A self-cleaning drive mechanism of claim 19, wherein each of said plurality of receiving means includes a chevron shaped bottom surface having at least one tapered relief surface.

21. A self-cleaning drive mechanism of claim 19, further comprising an adjustable biasing means for adjusting a force of engagement between said driving means and said cleaning means.

* * * * *